Dec. 9, 1969    O. M. MAIDE    3,482,827
EXHAUST HOOD FOR OXYGEN STEELMAKING CONVERTER
Filed Dec. 7, 1966    4 Sheets-Sheet 1
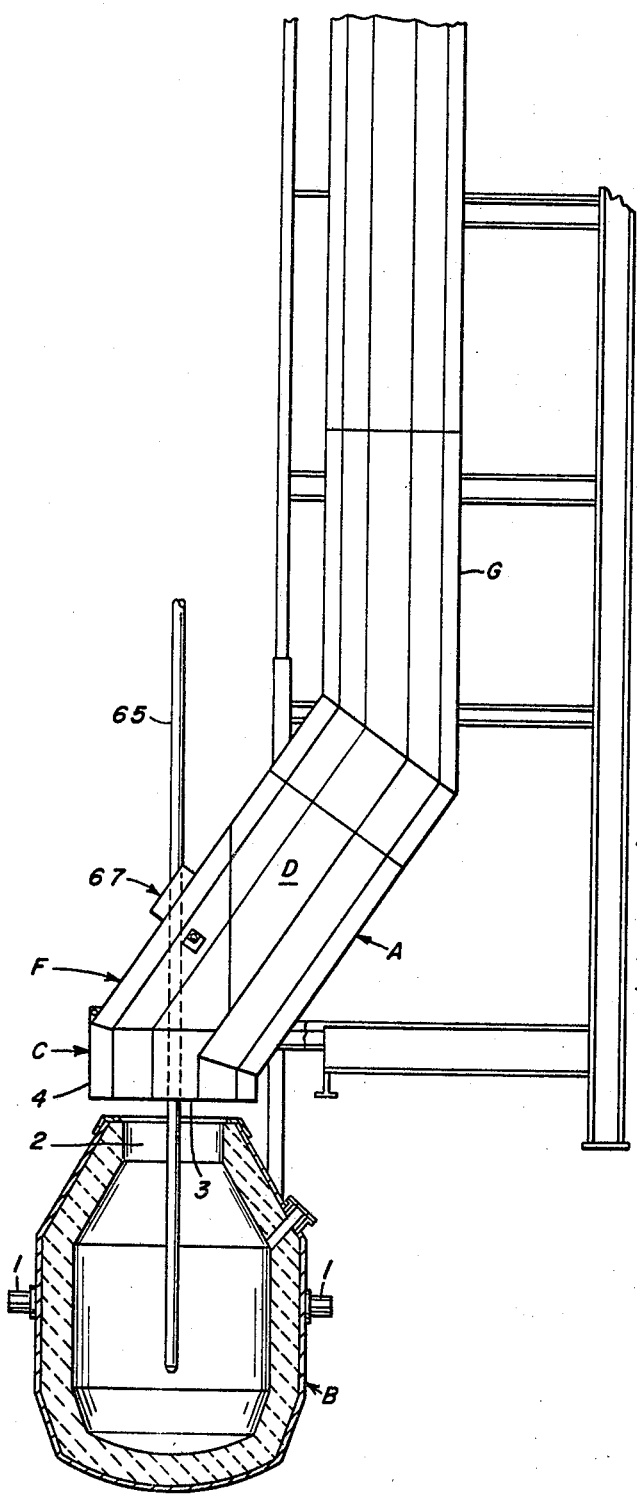
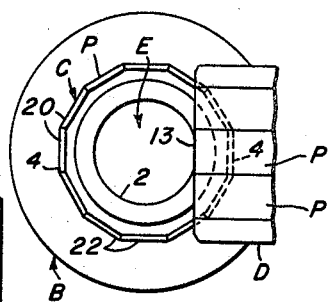
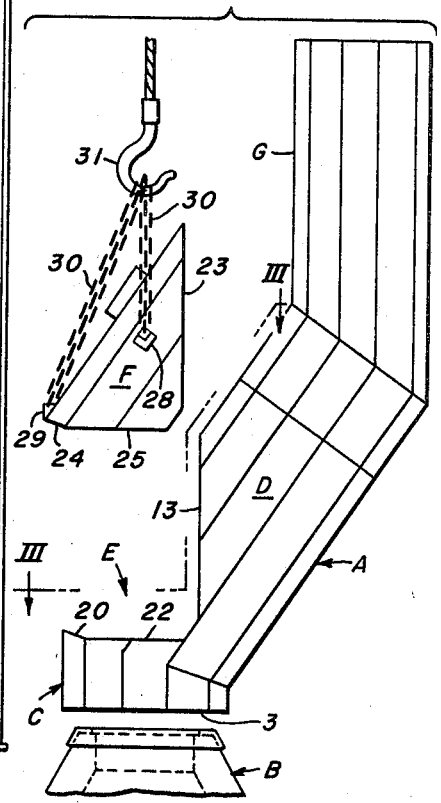
INVENTOR.
ORLAND M. MAIDE
By Donald G. Dalton
Attorney

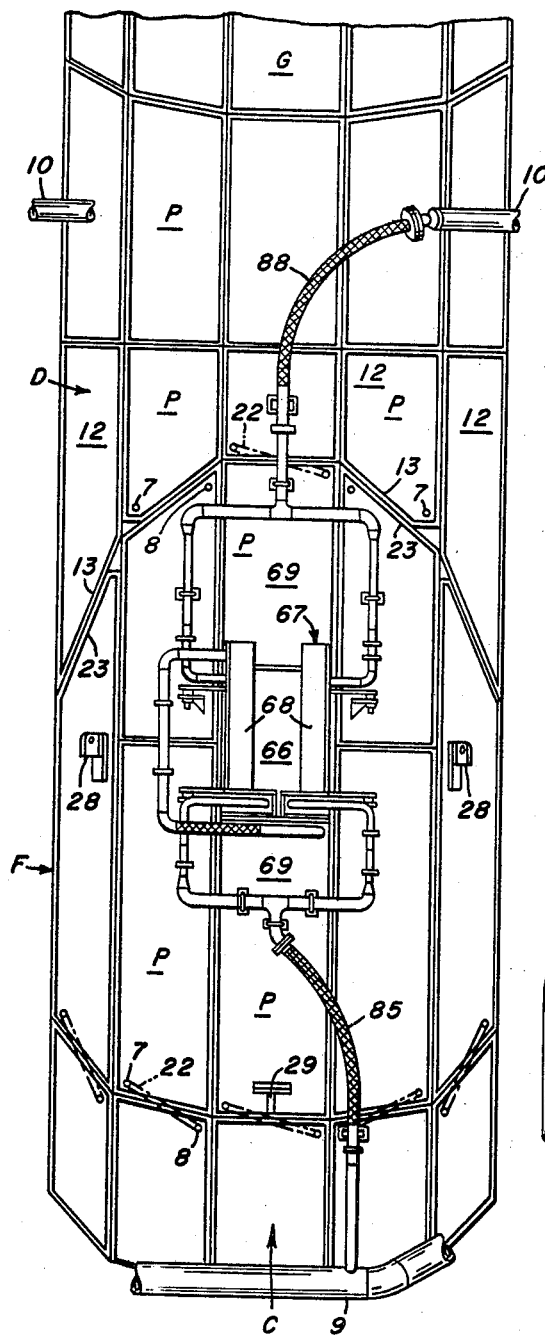
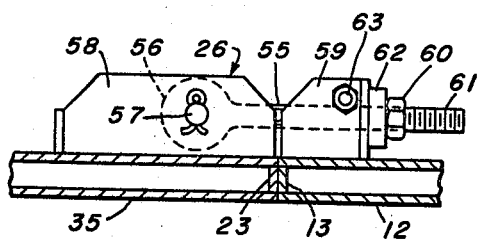
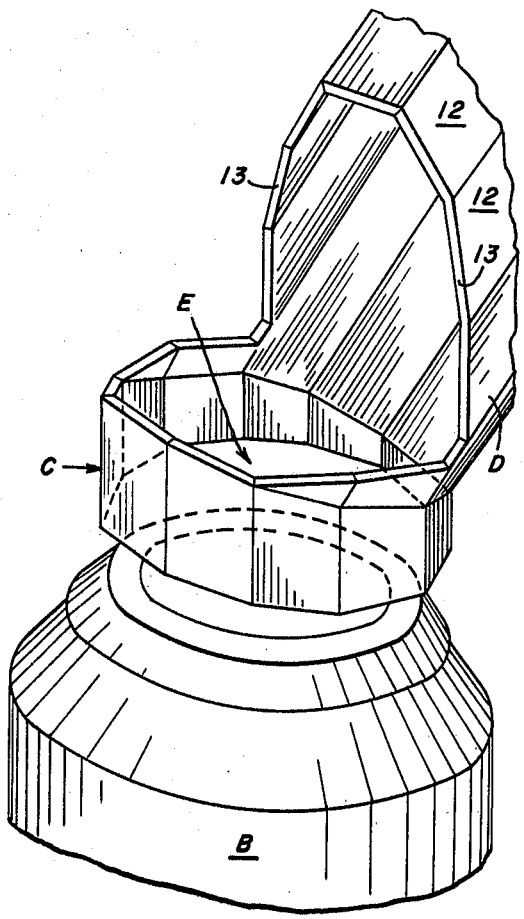
INVENTOR.
ORLAND M. MAIDE
By Donald G. Dalton
Attorney Dec. 9, 1969  O. M. MAIDE  3,482,827
EXHAUST HOOD FOR OXYGEN STEELMAKING CONVERTER
Filed Dec. 7, 1966  4 Sheets-Sheet 3
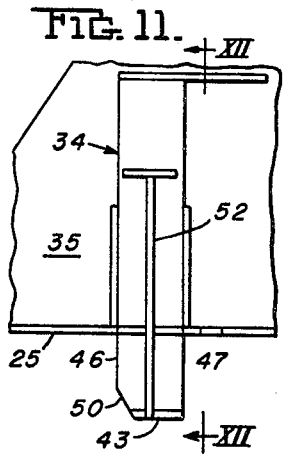
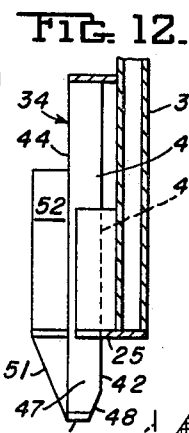
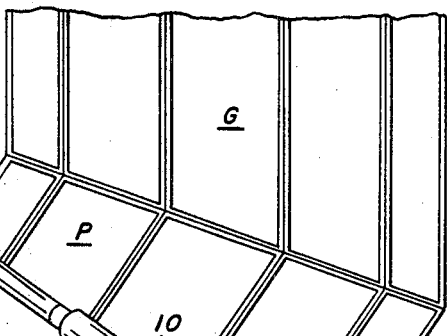
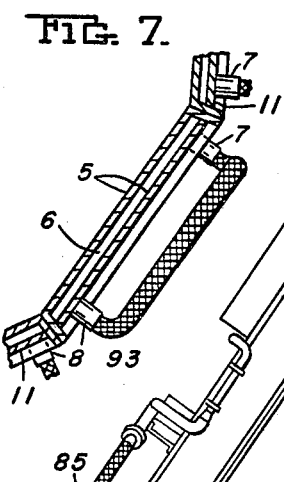
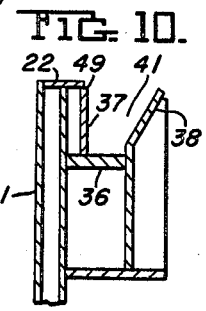
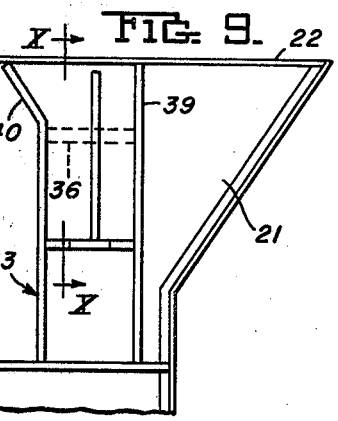
INVENTOR
ORLAND M. MAIDE
By Donald G. Dalton
Attorney

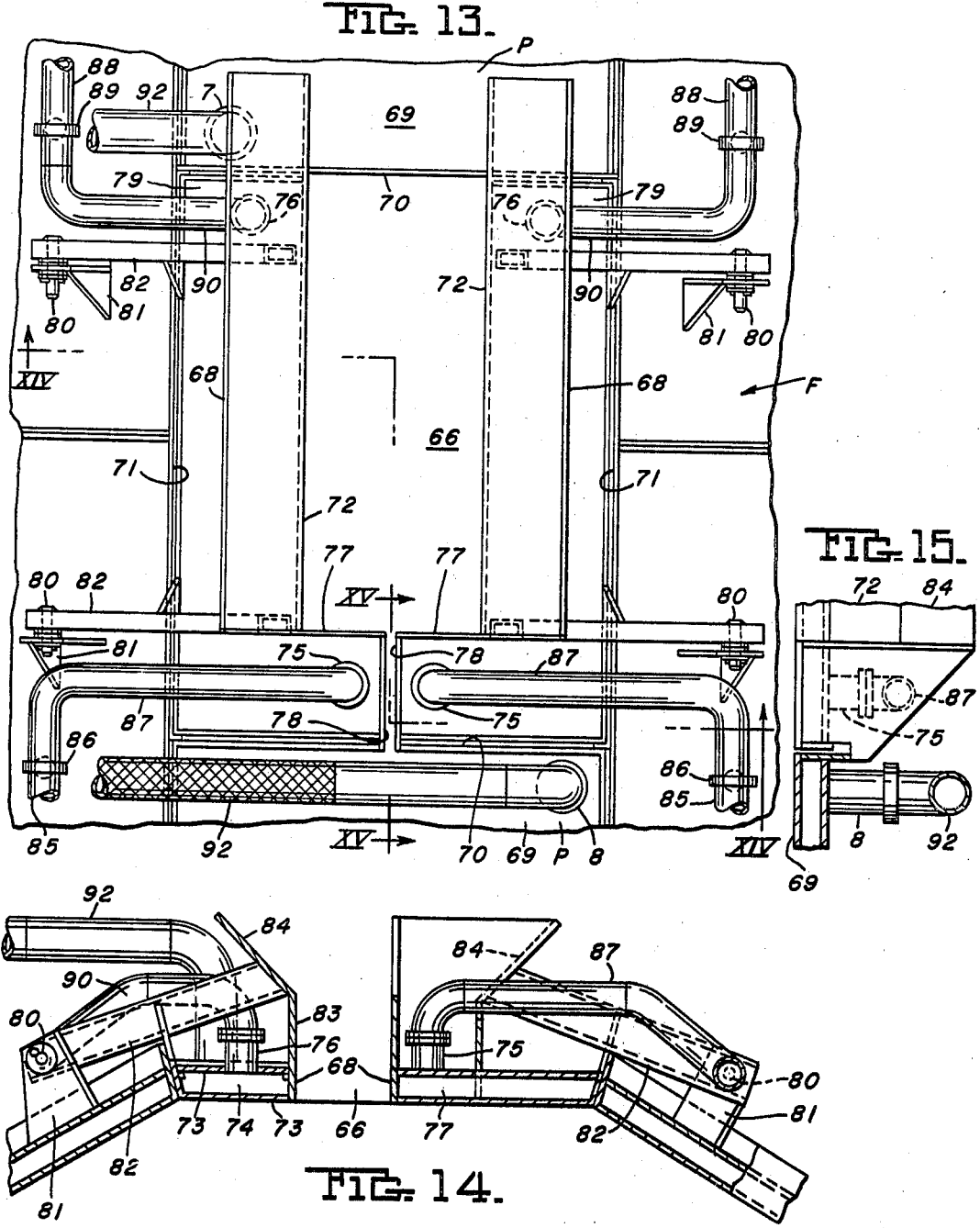

United States Patent Office 3,482,827
Patented Dec. 9, 1969

3,482,827
EXHAUST HOOD FOR OXYGEN STEELMAKING
CONVERTER
Orland M. Maide, Chesterton, Ind., assignor to United
States Steel Corporation, a corporation of Delaware
Filed Dec. 7, 1966, Ser. No. 599,868
Int. Cl. C21c 5/42, 5/32; F27d 1/18
U.S. Cl. 266—36                   7 Claims

ABSTRACT OF THE DISCLOSURE

An exhaust hood for an oxygen steelmaking converter having an opening therein vertically above the gas inlet at its lower end to provide unrestricted access to the interior of the converter for repairing or relining the refractory therein, and a detachable cover for closing said access opening to render the hood effective for the removal of gas received at its inlet, the cover for the access opening being further provided with a lance opening arranged centrally and vertically above the converter mouth, and having an assembly of water-cooled doors pivoted on opposite sides of the lance opening for movement to open position by skull on the lower end of the oxygen lance in response to its upward movement to a withdrawn position relative to the converter.

---

This invention relates to a hood for exhausting effluent gas from an oxygen steelmaking converter and is directed, more particularly, to improvements which expedite repair or relining of the converter refractory and provide for elevation of the oxygen lance to a withdrawn position without interference from skull which accumulates thereon during a blowing operation.

Refractory-lined vessels or converters of the Bessemer type are commonly used in oxygen steelmaking operations and are provided with trunnion supports for tilting movement to and from an operative blowing position in which the axis of the vessel extends vertically and the charging mouth at one end thereof opens upwardly. The oxygen for the refining operation is supplied by a water-cooled lance which is lowered vertically through the mouth of the converter, and the effluent gases resulting from such operation are removed through a water-cooled exhaust hood that extends angularly upwardly with respect to the converter and has a gas inlet at its lower end which is arranged over and concentrically with respect to the converter mouth for receiving gas therefrom. The exhaust hood also has a lance opening arranged centrally above its gas inlet to provide for vertical axial movement of the oxygen lance to and from an operative blowing position in the converter.

In oxygen converters of the type just described, repair or relining of the converter refractory as previously practiced requires that the exhaust hood be moved from the space over the converter mouth in order that access may be had to the interior of the converter. This requirement according to previous practices has been met either by dismantling the exhaust hood, or by mounting either the hood or the vessel on a carriage for relative lateral movement to a position in which the hood is located at one side of the converter and access may be had to its interior through its charging mouth.

One of the principal objects of this invention is to provide oxygen steelmaking apparatus in which both the converter and the hood are mounted in fixed positions relative to each other and in which dismantling of the hood is not required for access through the mouth of the converter to its interior in order to repair or replace its refractory lining. To this end, the exhaust hood is provided with an access opening which is arranged centrally over its gas inlet and the converter mouth, and which has a size at least as large in horizontal area as that of the converter mouth to provide for unrestricted access to the interior of the converter. During an oxygen blowing operation of the converter, the converter access opening in the hood is closed by a cover section which forms part of the hood and renders it effective for the removal of effluent gas from the converter.

Oxygen lances for converters of the character described above, being water-cooled, are subject to a troublesome operating problem from the collection of skull on their lower ends. When the skull collects on the lance in a sufficient amount, it will engage with the exhaust hood about the lance opening therein and hold the lance against further upward movement through the lance opening to a withdrawn position. A further object of this invention, accordingly, is to provide an exhaust hood which is constructed in such manner that skull on the lance will not be effective to hold the lance against upward movement through the lance opening therein. For this purpose, the cover section of the exhaust hood of this invention is provided with an oxygen lance opening that is defined at least in part by the adjacent edges of a pair of water-cooled doors on opposite sides of the path of axial movement of the lance to and from its operative blowing position in the converter. Such doors, in a manner to be described, have hinge-mountings for movement about parallel axes on opposite sides of the axial path of lance movement which provide for upward opening movement of the doors when engaged by skull on a lance moving vertically upwardly relative thereto to permit continued movement of the lance to a withdrawn position.

Other objects and advantages of the invention will become apparent from the following description.

In the drawings there is shown a preferred embodiment of the invention. In this showing:

FIGURE 1 is a side elevational view showing somewhat diagrammatically the construction and general arrangement of the exhaust hood of this invention with respect to an oxygen steelmaking converter, which is shown in vertical section;

FIGURE 2 shows the exhaust hood of FIGURE 1 with the cover section thereof disconnected and in the process of being removed by a chain-sling suspended from a mill crane;

FIGURE 3 is a plan view of the hood shown in FIGURE 2, looking in the direction of the line III—III of FIGURE 2;

FIGURE 4 is a perspective view of the exhaust hood with its cover section removed and showing the manner in which the access opening therein and its gas inlet provide unrestricted access to a converter through its charging mouth;

FIGURE 5 is an enlarged elevational view showing in greater detail the construction of the exhaust hood shown in FIGURE 1;

FIGURE 6 is a view looking in the direction of the line VI—VI of FIGURE 5;

FIGURE 7 is a sectional view taken along the line VII—VII of FIGURE 5, which illustrates the shell-wall construction of the water-cooled panels used in the construction of the exhaust hood;

FIGURE 8 is a sectional view taken along the line VIII—VIII of FIGURE 5, which shows in side elevation the construction of the releasable fastening members for holding the cover section in position on the exhaust hood;

FIGURE 9 is an elevation view on an enlarged scale of a fragmentary portion of the bottom hood section showing the construction of the socket for holding the cover section of the hood in its closed position;

FIGURE 10 is a sectional view taken substantially along the line X—X of FIGURE 9;

FIGURE 11 is an enlarged fragmentary elevational view of the detachable cover section showing the locking post thereon which is received in the socket shown in FIGURES 9 and 10;

FIGURE 12 is a sectional view taken substantially along the line XII—XII of FIGURE 11;

FIGURE 13 is a plan view on an enlarged scale showing in greater detail the gates or doors which are mounted on opposite sides of the lance opening as shown in FIGURE 6; and FIGURES 14 and 15 are sectional views taken respectively along the lines XIV—XIV and XV—XV of FIGURE 13.

FIGURES 1–4 of the drawings show the general arrangement of the exhaust hood A of this invention with respect to a refractory-lined vessel or converter B, which has the customary trunnions 1 on opposite sides thereof that provide for its tilting movement to and from an upright and operative blowing position under the lower end of the hood. Generally stated, the hood A comprises a bottom section C that extends vertically upwardly and an inclined section D that extends angularly upwardly and outwardly with respect to the bottom section C and the converter mouth 2. The bottom section C and inclined section D are constructed to provide an access opening E, which is normally closed by a cover F during blowing operation of the converter B. The hood sections C, D and F are fabricated from water-cooled panels in a manner to be described, and when the cover F is in its assembled position as shown in FIGURE 1 such sections provide an exhaust enclosure or passage extending from the gas inlet 3 at the lower end of the bottom section C through the section D to an exhaust stack G, which delivers the gas to cleaning apparatus. The inlet 3 has a transverse dimension between panels 4 at diametrically opposite sides of the bottom section C which is larger than the diameter of the converter mouth 2 so that all of the gas emerging from the mouth 2 during an oxygen blowing operation enters the inlet 3 for transfer by the hood A to the stack G. In addition, the respective sizes of the opening E and inlet 3 are such that unrestricted access may be had through the converter mouth 2 to the interior of the converter for repair and replacement of its lining, when the cover F is disconnected and removed from its assembled position with respect to bottom section C and main section D in a manner to be described. In this respect, it will be noted that the opening E has a horizontal area such that it permits a repair tower (not shown) to be lowered by a mill crane through the hood A into the converter B. This may be done without taking the hood A apart or removing it from its position relative to the converter B as shown in the drawings, it being necessary only to remove the cover section F for this purpose.

The sections D, F, and C of the hood A are fabricated from water-cooled panels P which are shaped and bolted together in the relative positions shown in FIGURES 5 and 6 in which they cooperate to form the enclosure or passage through which gas is exhausted from the inlet 3 to the stack section G. Each of the panels P has a shell-wall construction which, as shown in FIGURE 7, comprises spaced parallel plates 5 that define a space 6 through which cooling water is circulated between inlet and outlet connections 7 and 8 at opposite ends of each panel P that are respectively connected with supply and exhaust header pipes 9 and 10 for the circulation of water therethrough. Flanges 11 along opposite ends and sides of each panel P provide for connection of the panels in each of the sections C, D, and F, by bolts (not shown) along the lengths thereof. The flanges 11 extend beyond the outer plates 5 to provide for their being fastened together in this manner.

In accordance with the principles of this invention, and as stated above, the hood sections C and D are constructed to provide the opening E which is closed by the cover F. For this purpose, the lowermost panels P in the upper half of the hood section D, which are respectively designated by the numeral 12, have terminal ends 13 that face outwardly to the left as viewed in FIGURES 2–5 and are arranged in a common vertical plane, while the remaining lowermost panels P in the lower half of the section D, which are respectively designated by the numeral 14, have terminal ends 15 that are permanently connected with the terminal ends 16 of the vertically extending panel sections 17 in the lower section C, the ends 15 and 16 being respectively arranged along an angularly inclined plane 18. The connection of the panel ends 15 and 16 with each other provides a supporting connection for the hood section C on the lower end of the inclined section D, such supporting connection being at one side of the access opening E and extending arcuately around a portion of its periphery. The vertical ends 13 thus define one side of the opening E which is positioned radially outwardly with respect to the converter mouth 2 as viewed in FIGURES 2 and 4. At the other side of the bottom section C, the vertical panels 19 have their upper terminal ends 20 arranged in the plane 18, while the intermediate panels 21 have their upper ends 22 arranged in a common horizontal plane at opposite sides of the opening E. In this manner, the periphery of the opening E is defined by the vertically extending and outwardly facing ends 13 of the panels 12 in the inclined section D, and by the upwardly facing ends 22 and 20 of the panels 19 and 21 in the bottom hood section C. The boundaries of the opening E, as defined by the panel ends 13, 20 and 22, are arranged outwardly with respect to the periphery of the converter mouth 2 as shown in FIGURE 3. In this manner, the area above the converter mouth 2 is not obstructed by any portion of the hood A when its cover section F is removed, and unrestricted access may thus be had to the interior of the converter B through the opening E, the gas inlet 3 and the converter mouth 2.

The panels P of the cover F, when it is in the assembled position over the opening E as shown in FIGURE 5, form extensions of the panels 12 of the hood section D, and have terminal ends 23 that are arranged in a common vertical plane and face outwardly toward the ends 13 of the panels 12 for engagement therewith. The opposite ends of the panels P in the cover F have terminal ends 24 and 25 that face downwardly toward the upper ends 20 and 22 of the panels 19 and 21 in the lower hood section C. In the assembled position of the cover F on the lower section C, disconnectable fastening members 26 on opposite sides of the hood A operate to hold the panel ends 23 of the cover F engaged with the panel ends 13 of the panel 12 in the inclined section D. The means for holding the cover F in its assembled position on the hood A is completed by a pair of combined guide and locking devices, respectively indicated as a whole by the numeral 27, which are located in similar positions on opposite sides of the exhaust hood A, only one of which is shown in the drawings. A pair of anchoring lugs 28 on opposite sides of the cover F and an anchoring lug 29 at the bottom of its central panel are provided for connection with chains 30 of a sling for suspending the cover F from the hook 31 of a mill crane hoist for movement thereby to and from its assembled position.

Each of the guide and locking devices 27 comprises a holding socket 33 secured to the upper end of one of the panels 21 of the lower section C and a locking post 34 on the corner panel 35 of the cover section F. As shown in FIGURES 9 and 10, the holding socket 33 is fabricated from steel plates that are welded in position on the outer surface of the panel 21 and include a horizontal base plate 36, a vertical inner side plate 37 parallel to the panel 21, an outwardly inclined outer side plate 38, a vertical end plate 39 and an inclined end plate 40. The side and end plates 37–40 define a socket recess 41 over the base plate 36. As shown in FIGURES 11 and 12, the locking post 34 is also fabricated from steel plates that are welded in position on the outer surface of the corner panel 35. Its lower end is in the form of a box-like extension 42 spaced outwardly and extending downwardly from the lower end 25 of the panel 35, and comprises a bottom plate 43, side plates 44 and 45 that are welded in spaced positions parallel to the panel 35, and transversely extending end plates 46 and 47 that are welded to the side plates 44 and 45. The inner side plate 45 has a tapered lower end 48 for camming engagement with the upper edge 49 of the inner socket side plate 37 to guide the post 32 into the socket recess 41. The end plate 46 has a tapered lower end 50 for engagement with the inclined socket end plate 40 to further guide the downward movement of the locking post 42 into the socket recess 41. A final guiding action is performed by a tapered surface 51 on the lower end of a reinforcing bar 52 welded to the outer side plate 44. The tapered surface 51 has guiding engagement with the tapered socket side plate 38 during downward movement of the post 42 into the socket recess 41. When the post 42 is lowered into the socket 41 in this manner, its bottom plate 43 engages the socket base plate 36 to support the cover section F thereon. In this respect, it will be noted that the locking post extension 42 has a vertical dimension below the panel end 25 which is greater than the vertical depth of the socket recess 41 below the upper end 22 of the panel 21 so that the cover F is supported thereby in an elevated position relative to the bottom hood section C, with the panel ends 25 and 22 spaced vertically relative to each other, to provide for thermal expansion of the panels P in the cover F and in the bottom section C due to temperature changes thereof in operation.

Each of the fastening devices 26, as shown in FIGURES 5 and 8, comprises a locking pin 55 which has one end 56 thereof mounted for swinging movement on a pivot pin 57. The pin 57 has its opposite ends supported in a pair of bracket plates 58 welded to and extending outwardly from the outer surface of the corner panel 35. In its holding position, the pin 55 extends between a pair of plates 59. An adjusting nut 60 threaded on the outer end 61 of the pin 55 operates through a washer 62 to draw the pin 55 to the right as viewed in FIGURE 8 to move the panel ends 23 of the cover F into tight engagement with the panel ends 13 of the panels 12 in the inclined hood section D. A detachable locking pin 63 extending between the bracket plates 59 operates to lock the pin 55 against swinging movement out of the holding position shown in the drawings.

FIGURE 1 shows the operative blowing position of an oxygen lance 65 relative to the converter vessel B, the lance 65 being suspended from operating mechanism (not shown) for axial movement to and from the position. In this position, the lance 65 extends vertically and centrally through the converter mouth 2, the exhaust hood gas inlet 3, and a lance opening 66 (FIGURE 13) in the cover section F, the opening 66 being centered with respect to the path of axial movement of the lance 65 and being defined in part by the door assembly 67 of this invention which minimizes the required size of the opening 66. The door assembly 67 includes a pair of doors 68 that are opened when engaged by skull on a lance moving upwardly through the opening 66 to a withdrawn position relative to the converter B. As shown in FIGURE 13, the cover section F has two centrally located and longitudinally spaced panels P, respectively designated by the numeral 69, the adjacent ends 70 of which define opposite ends of the opening 66. The sides of the opening 66 are defined by the adjacent side edges 71 of the panels P that extend along opposite sides of the central panels 69. The opening 66 thus has a rectangular shape with its longitudinal center line parallel to the axis of the section D and located in a vertical plane containing the path of axial movement of the lance 65. The effective width of the opening 66 is determined by the adjacent edges 72 of the doors 68, which are shown in the drawings in their closed positions in which they partially close the space between the panel edges 71. This width of the opening 66 between the door edges 72 is roughly twice the diameter of the lance 65 to provide for its free movement to its operative blowing position in the converter B as shown in FIGURE 1. In a manner to be described, the doors 68 are hinged for pivotal movement in opposite rotational directions about parallel axes on opposite sides of the panel edges 71, and open when engaged by skull on a lance moving upwardly through the opening 66 out of the converter B.

The doors 68 are L-shaped water-cooled panels which comprise spaced inner and outer plates 73 that define a chamber 74 through which water is circulated from an inlet 75 at one end to an outlet 76 at the other end thereof. The doors 68 are shown in the drawings in their closed position in which their inner and outer plates 73 are flush with the inner and outer surfaces of the panels 69. The base portions 77 of the L-shaped doors 68 project toward each other and have their facing ends 78 arranged along the longitudinal center line of the opening 66. The water inlets 75 open into the base portions 77 of the doors 68 adjacent the ends 78 thereof, and the water outlets 76 open into the upright portions 79 of the L-shaped doors 68 adjacent the upper ends thereof as viewed in FIGURE 13. The doors 68 are mounted for pivotal movement in opposite rotational directions to and from their closed positions about parallel axes on opposite sides of the opening 66. The hinge-mountings for the doors 68 respectively comprise a pair of axially aligned pivot pins 80 mounted for rotation in brackets 81 on the panels P extending along opposite sides 71 of the opening 66, the doors being supported for rotation about the axes of the pivot pins 80 by hinge arms 82. This hinge-mounting of the doors on the pivot pins 80 thus provides a gravitational bias for their movement to closed position. Funnel-shaped guide plates 83 project upwardly from the inner door edges 72 and respectively have inclined surfaces 84 which engage and guide the lower end of a lance 65 into the opening 66 as it is lowered into the converter B.

Cooling water is delivered through the inlets 75 to the chambers 74 by water supply lines 85 which respectively include a flexible ball-joint rotary coupling 86 of conventional construction in alignment with the axis of the pivot pins 80 to provide for rotary movement of the portion 87 thereof with pivotal movement of the door 68 with which it is connected. The connections of the cooling water exhaust lines 88 with the water outlets 76 also include conventional flexible ball-joint rotary couplings 89 which provide for pivotal movement of the portions 90 thereof about the door pivot axes during opening and closing movement. The connections of the supply line 85 with the supply header 9 and of the exhaust line with the exhaust header 10 respectively include quickly disconnectable couplings 91 of conventional construction, for example, "Victaulic" couplings, which provide for their disconnection and removal of the cover section F in a minimum of time. Cooling water exhausted from the outlet 8 of the lower panel 69 is supplied to the inlet 7 of the upper panel 69 by a connecting hose 92 having quickly detachable couplings (not shown) similar to the couplings 91 at opposite ends thereof for connection with the outlet 8 and inlet 7 shown in FIGURE 13. Detachable hose connections, which are designated diagrammatically by dotted lines 93 in FIGURES 5 and 6 and also have quickly disconnectable couplings (not shown) similar to the couplings 91 at opposite ends thereof, are employed to connect the cooling water outlets 8 of the panels P in the lower section C with the inlets 7 of the panels P in the cover section F, and to connect the water outlets 8 of the cover section panels P with the inlets 7 at the lower ends of the panels 12 in the inclined section D.

The door assembly 67 described above is effective to minimize the area of the opening 66 which is open to the atmosphere. In operation, the lance 65 is lowered vertically in the usual manner through the opening 66 into the converter B. As such lowering movement takes place, the funnel-shaped inclined guiding surfaces 84 on the doors 68 guide the lower end of the lance through the portion of the lance opening 66 between the door edges 72. The provision of the doors 68 and their pivotal mounting, however, provides for upward movement of the lance 65 after the formation of skull on its lower end during the blowing operation of the converter. When skull forms on the lance in an amount such that the diameter of its outer surface is greater than the width of the lance opening 66 between the door edges 72 the skull will engage with the inner door plates 73 as the lance 65 is raised toward its withdrawn position. Continued upward movement of the lance under this condition will result in the skull thereon pivoting one or both of the doors 68 about their hinge pins 80 to an open position in which the distance between the door edges 72 is sufficient for the skull on the lance to pass therethrough. After the skull on the lance has moved beyond the doors 68, the gravitational bias provided by the mounting of this invention will be effected to return the doors 68 to their closed position shown in the drawings. The sound made by the doors 68 returning to their closed position will warn the operator that skull has collected on the lance and should be removed before the lance is lowered again to its blowing position.

When repair or replacement of the refractory lining in the converter B is required, the cover section F may be readily and quickly removed to uncover the opening E so that access may be had therethrough to the interior of the converter. To remove the cover F, it is only necessary to disconnect the water circulating hose connections 91 for the hoses 85 and 88 to the water supply and exhaust headers 9 and 10 and the similar connections for the hoses 93 between the panels of the cover section F and the panels of the cover sections C and D. After this has been done, the fastening devices 26 on opposite sides of the hood A are released to free the cover section F for connection with the chain sling 30 and its removal by the mill crane hoist hook 31. A repair tower (not shown) and the necessary equipment for repairing or replacing the refractory lining in the converter B may then be lowered by the mill crane through the opening E in the converter mouth 2.

While one embodiment of my invention has been shown and described, it will be apparent that adaptations and modifications may be made without departing from the scope of the appended claims.

I claim:
1. An exhaust hood for an oxygen steelmaking converter having a charging mouth at one end thereof comprising a vertically extending bottom section having a downwardly opening inlet centered over the mouth of said converter for receiving gas therefrom, an inclined section extending angularly upwardly and outwardly from said bottom section for the exhaust movement of gas therethrough, said bottom section having an upper edge lying in a substantially horizontal plane and extending around a major portion of its periphery and said inclined section having an outwardly facing edge lying in a vertical plane at one side of said converter mouth, said vertical and horizontal edges defining an opening extending through said inlet and providing unobstructed access to said converter through the mouth thereof, and a cover detachably mounted over said access opening and cooperating with said bottom and inclined sections to provide a closed passage for the exhaust of gas from said inlet through said inclined section, said cover having a horizontal lower edge coextensive with and supported on the said horizontal edge of said bottom section and a vertical side edge facing and engaged with the said vertical edge of said inclined section, and disconnectable fastening means securing said cover in its closed position on said bottom and inclined sections.

2. An exhaust hood as defined in claim 1 characterized by said cover having an opening therein providing for vertical axial movement of an oxygen lance therethrough to and from an operating position in said converter, said opening being centered over said converter mouth when said converter is in an upright blowing position, and a water-cooled door having a pivot support on said cover at one side of said opening and normally occupying a closed position reducing the effective size of said opening but out of the path of vertical movement of said lance, said door having a bias for the movement toward said closed position, and being movable against the action of its said bias to increase the effective size of said cover opening in response to engagement by skull on said lance during upward movement thereof out of said furnace.

3. An exhaust hood as defined in claim 2 characterized by there being a pair of said doors respectively mounted on opposite sides of said cover opening, said doors having adjacent edges that are respectively spaced from the axes of their pivot supports, said door edges being parallel and when in their closed positions being spaced apart a distance greater than the diameter of said lance to provide for free axial movement therethrough to and from an operative blowing position in said furnace.

4. An exhaust hood as defined in claim 3 characterized by each of said doors having a funnel-shaped guide mounted adjacent its said respective edge for guiding the lower end of an oxygen lance through the space between said door edges upon downward movement of the lance into said furnace.

5. An exhaust hood as defined in claim 3 characterized by each of said doors having water circulating connections at opposite ends thereof, and means for circulating water through said connections comprising water circulating conduits respectively having a rotary coupling with the axes of rotation thereof coinciding with the pivot axes of said doors to provide for swiveling movement of said connections with pivotal movement of said doors.

6. In an exhaust hood for an oxygen steelmaking converter, the combination with a plurality of flat water-cooled panels arranged in spaced relation to define a rectangularly shaped opening for vertical axial movement therethrough of an oxygen lance into said converter, said opening having its longitudinal center line parallel to the axis of said hood and lying in a vertical plane containing the path of axial movement of said lance, a pair of water-cooled doors on opposite sides of said opening, hinge means mounting said doors for swinging movement in opposite rotational directions about parallel axes to and from a closed position in said opening, said doors when in said closed position having parallel edges spaced apart a distance greater than the diameter of said lance but less than the width of said rectangular opening and thus reducing the effective width of said opening to a size providing for free movement of said lance into said furnace, said hinge means including means providing for swinging movement of said doors to open position when engaged by skull on a lance moving upwardly out of said converter through said opening, and water-circulating means at opposite ends of each of said doors respectively comprising a water-circulating conduit extending radially with respect to one of said hinge axes and having a connection at one end with one of said ends for swinging movement therewith, and a rotary coupling connected to the other end of said conduit, said coupling having an axis of rotation aligned with said one hinge axis to provide for swinging movement of said conduit about said one hinge axis.

7. In apparatus for exhausting gas from an oxygen steelmaking converter of the type having a charging mouth at one end thereof and a pivotal support for movement to and from an operative blowing position in which its said mouth opens upwardly, the combination with an exhaust hood extending angularly upwardly and outwardly from the upper end of said converter and having at its lower end a downwardly facing gas inlet centered over said converter mouth for receiving gas therefrom when said converter is in its said operative position, said hood having an opening therein providing for vertical axial movement of an oxygen lance therethrough to and from an operating position in said converter, said opening being centered over said converter mouth when said converter is in an upright blowing position, a pair of water-cooled doors on opposite sides of said opening, hinge means mounting said doors for swinging movement in opposite rotational directions about parallel axes to and from a closed position in said opening, said doors when in said closed position having parallel edges spaced apart a distance greater than the diameter of said lance but less than the width of said rectangular opening and thus reducing the effective width of said opening to a size providing for free movement of said lance into said furnace, said hinge means including means providing for swinging movement of said doors to open position when engaged by skull on a lance moving upwardly out of said converter through said opening, and water-circulating means at opposite ends of each of said doors respectively comprising a water-circulating conduit extending radially with respect to one of said hinge axes and having a connection at one end with one of said door ends for swinging movement therewith, and a rotary coupling connected to the other end of said conduit, said coupling having an axis of rotation aligned with said one hinge axis to provide for swinging movement of said conduit about said one hinge axis.

References Cited

UNITED STATES PATENTS

| | | | |
|---|---|---|---|
| 3,205,810 | 9/1965 | Rasenak | 266—35 X |
| 3,269,716 | 8/1966 | Walker | 266—35 |
| 3,331,598 | 7/1967 | Schanen | 266—31 X |
| 3,347,539 | 10/1967 | Mitchell et al. | 266—35 |
| 3,168,073 | 2/1965 | Durham | 122—7 |
| 3,320,931 | 5/1967 | Durham | 122—7 |
| 3,323,495 | 6/1967 | Blaskowski | 122—7 |

J. SPENCER OVERHOLSER, Primary Examiner

R. D. BALDWIN, Assistant Examiner

U.S. Cl. X.R.

98—115; 122—7

UNITED STATES PATENT OFFICE
CERTIFICATE OF CORRECTION

Patent No. 3,482,827 December 9, 1969

Orland M. Maide

It is certified that error appears in the above identified patent and that said Letters Patent are hereby corrected as shown below:

Column 8, line 65, before "ends" insert -- door --.

Signed and sealed this 27th day of October 1970.

(SEAL)
Attest:

Edward M. Fletcher, Jr.
Attesting Officer

WILLIAM E. SCHUYLER, JR.
Commissioner of Patents